Feb. 13, 1951 R. PRESCOTT 2,541,437
APPARATUS FOR INVESTIGATING OPTICAL REFRACTION
PHENOMENA IN GASEOUS MEDIA
Filed July 30, 1948 3 Sheets-Sheet 2

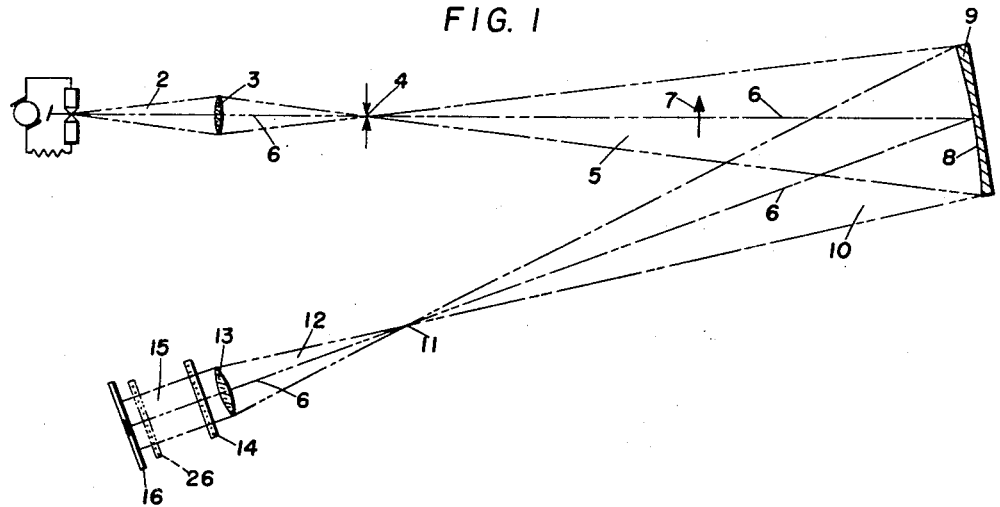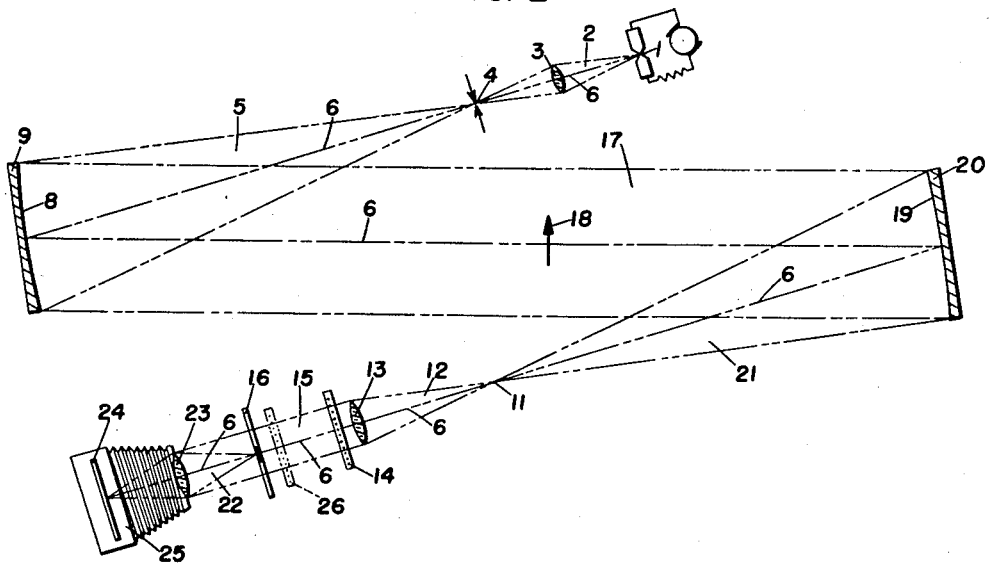

INVENTOR.
ROCHELLE PRESCOTT
BY
ATTORNEY

Feb. 13, 1951 R. PRESCOTT 2,541,437
APPARATUS FOR INVESTIGATING OPTICAL REFRACTION
PHENOMENA IN GASEOUS MEDIA
Filed July 30, 1948 3 Sheets-Sheet 3

INVENTOR.
ROCHELLE PRESCOTT
BY
ATTORNEY

Patented Feb. 13, 1951

2,541,437

UNITED STATES PATENT OFFICE 2,541,437

APPARATUS FOR INVESTIGATING OPTICAL REFRACTION PHENOMENA IN GASEOUS MEDIA

Rochelle Prescott, Washington, D. C., assignor to United States of America as represented by the Secretary of the Navy Application July 30, 1948, Serial No. 41,653

3 Claims. (Cl. 88—14)

The present invention relates in general to apparatus for investigating optical refraction phenomena in gaseous media. More specifically, it relates to such apparatus designed for use in the evaluation and recording of supersonic flow phenomena, especially in wind tunnels.

While it has long been known that inhomogeneities in gaseous media may be observed and recorded by reason of the optical refraction effects resulting therefrom, under proper conditions of illumination, and "schlieren" photographs of sound waves, shock waves, and the like are common, heretofore, when quantitative interpretation was desired, delicate and expensive devices, such as interferometers and similar apparatus have usually been employed in observing the phenomena, and in securing such records.

It is an object of the present invention to provide a relatively simple and inexpensive apparatus for quantitatively observing and recording such phenomena, by application of an improved modification of an optical procedure known as the "Ronchi Test," which test originally was specifically designed for and heretofore employed only in, the testing of optical surfaces.

Other objects and many of the attendant advantages of this invention will be appreciated readily as the invention becomes understood by reference to the following detailed description, when considered in connection with the accompanying drawings, wherein:

Fig. 1 is a diagram showing in plan the relative positions of the optical and other components of one form of the apparatus, and the course of the light rays, for visual observation;

Fig. 2 is a similar diagram showing a somewhat modified assemblage, in this case, incidentally, showing also how a camera may be provided, to yield a permanent record of the phenomena, in either assemblage;

Figure 3:
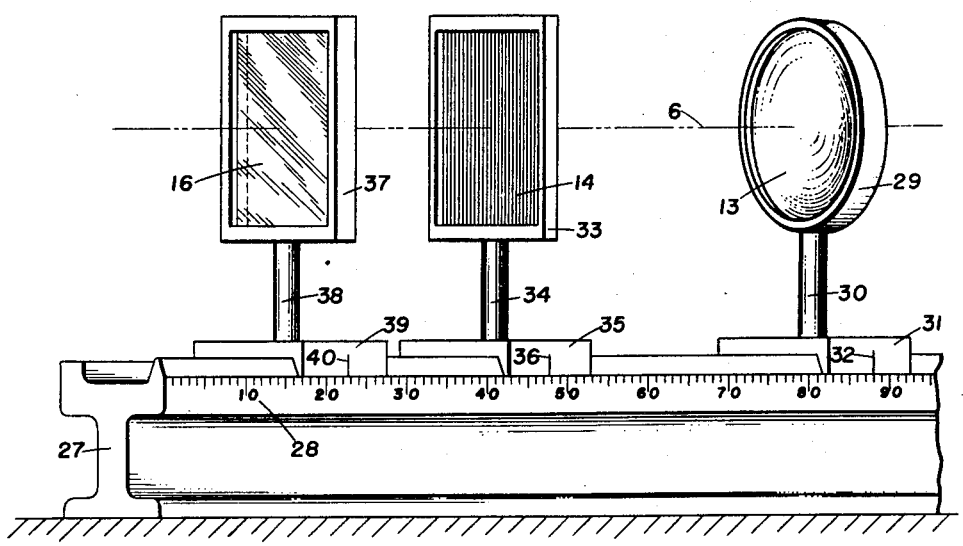
Fig. 3 is an elevation of a portion of the device including the Ronchi grating and associated elements.

Referring first to Fig. 1, there is shown a source of light 1, preferably of high intensity and small area, approaching a "luminous line" source, perpendicular to the plane of the drawing. The pencil 2 of rays from this source passes to the positive lens 3, which focuses it as a line-image at the slit 4, said slit 4 and the source 1 being at a pair of conjugate foci of lens 3. Obviously, and incidentally, relative shifting of elements 1, 3 and 4 will afford control of the light intensity at the slit 4, as well as of the angular magnitude of the pencil 2.

A concave, front-surface reflector 9 is arranged with an optical axis 6 alined with that of the light source and slit as shown, and is tilted slightly so that the axis 6 of the pencil 10 after reflection from the reflecting surface 8 will be at a convenient angle to the axis of the incident pencil 5.

The curvature of the reflecting surface 8 is so related to the distance from the slit 4 that at a convenient location 11 an image of said slit 4 will be formed, as indicated by the crossing of the rays. This is a real image, but it is ordinarily not received on a screen, the pencil 12 again expanding beyond it.

A second positive lens 13 is placed with its principal focus at 11, to receive the expanding pencil 12 of rays and render said rays parallel, to form the beam 15. A Ronchi grating 14, which is a known optical device consisting of a plane array of parallel, uniformly spaced, opaque, straight elements, such as wires, or narrow stripes on a transparent carrier, or equivalents thereof, is placed in the parallel beam 15, with its plane normal to the direction of said beam, and with said opaque elements parallel to the image of the slit.

Information concerning the Ronchi grating is to be found in the article by Vasco Ronchi, printed in Italian, in "Attualita Scientifiche, N. 37," Nicola Zanichelli editor, and entitled "La Prova dei Sistemi Ottici." This number was published in 1925 at Bologna. The article describes a method of testing the figure of optical surfaces, in particular of mirrors, the test being related to the familiar Foucault knife-edge test, with the difference that a grating is used in place of a knife-edge, and that said grating is placed near the focal point, instead of at the focal point itself.

An image-receiving screen 16, such as a ground glass plate, completes the apparatus. It should be noted that the screen 16 and the object 7, which is being studied, occupy such relative positions that with respect to the optical system between them, consisting of lens 13 and reflector 9, these positions constitute conjugate foci. Consequently a real image of the object 7 appears on screen 16.

While the simpler form of the invention above disclosed is effective and adequate for many purposes, a more elaborate form, shown in Fig. 2, has additional advantages, which will be discussed later.

Here the light source 1, lens 3, slit 4 and mirror 9 with front reflecting concave surface 8 are, or may be, identical in structure and relative arrangement with those already described, and correspondingly numbered.

However, after reflection from surface 8, the divergent pencil 5 becomes a beam 17 of parallel rays, this being accomplished by locating the slit 4 at the principal focal distance from surface 8.

The object 18 under examination may be placed anywhere in this parallel beam 17, but its location determines the location of the conjugate plane 16, the latter being the same as member 16 of Fig. 1 in purpose and position, as will be explained below.

When the parallel beam 17 strikes the concave front reflecting surface 19 or mirror 20, it becomes a convergent pencil 21 of rays, which cross at 11, conjugate to the slit 4, as in Fig. 1. From this point on, reference characters 12, 13, 14, 15 and 16 designate parts and locations identical with those so marked in Fig. 1.

An additional feature in Fig. 2 is the camera 25, whose lens 23 receives the divergent pencils 22 of rays from the plane of screen 16 and focuses an image on its sensitive plate or film 24, to make a photograph, when such is desired. It will, of course, be understood that optionally such camera may be added to Fig. 1 if desired, or omitted from Fig. 2 if not needed. Of course, the screen 16 is removed when the camera is used.

Referring now to Fig. 3, the elevation of the sub-assembly comprising the lens 13, grating 14 and screen 16, together with a portion of an optical bench 27 supporting said elements, is shown, as it would appear when viewed in substantially the direction parallel to arrows 7 and 18 of Figs. 1 and 2. For convenience in determining and/or duplicating the settings of the lens, grating and screen, a scale 28 may be provided on the optical bench 27.

The lens 13 is shown with a cylindrical mount 29 carried by a rod 30 mounted on a base or slide 31, having an index mark 32. This base is slidable along the optical bench 27 in the customary manner.

The Ronchi grating 14, which here consists of a group of uniformly spaced, vertical wires, held in a frame 33, is likewise mounted on a slidable base 35 by means of a rod 34, and an index mark 36 is provided on said base.

The screen 16 is held in a suitable frame 37, carried by a rod 38 mounted on a slidable base 39, with an index mark 40.

All three, namely lens 13, grating 14 and screen 16, are mounted to aline with the optical axis 6 of the mirror-lens system of Fig. 1 or 2, such alinement being maintained automatically by the sliders 31, 35 and 39 in the customary way. The indexes 32, 36 and 40 coact with the scale 28, for the purpose already stated.

Figure 4:
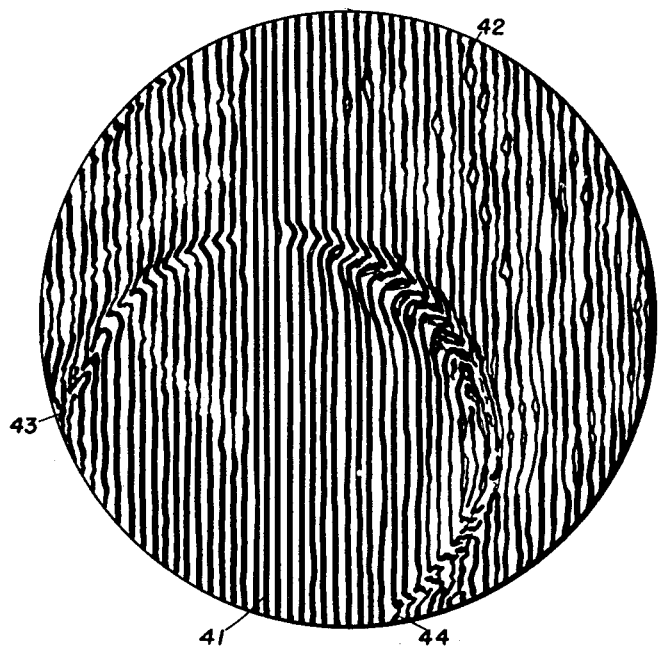
Fig. 4 is a copy of a photographic record made by the device, showing optical defects in a glass disc.

Fig. 4 is a copy of a photographic print made by the apparatus of the present invention. It will be noted that it consists of a number of dark lines that have the same general direction, but some of which, like line 41, are substantially straight and fairly smooth, while others, like line 42, are very rough, sometimes enclose clear spots, and include badly distorted portions. Each line, however, is a representation of a corresponding wire of the grating 14.

Figure 5:
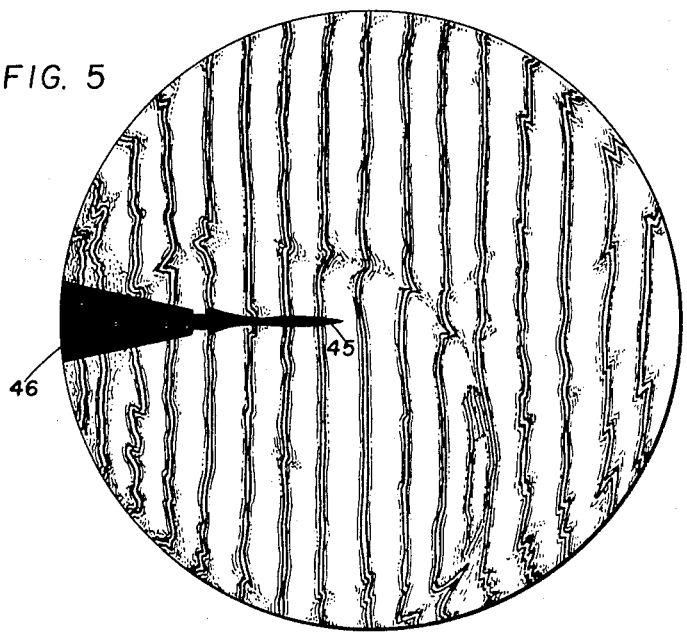
Fig. 5 is a copy of a similar record, made with a different screen and showing a gas at rest.

Fig. 5 shows mainly the same subject as Fig. 4, but with an additional solid object in the field, appearing as a black shadow. This Fig. 5, as well as Fig. 6, differs from Fig. 4, however, in that a Ronchi grating with much wider spacing of its opaque elements was used here, giving considerably less detail. In Fig. 5 the gaseous medium is at rest, while in Fig. 6 it is in motion, at supersonic velocity.

In operation, the "object" represented by the arrow 7 in Fig. 1, and the arrow 18 in Fig. 2, is really not an object of the kind customarily so designated in optics, but usually is merely a region whose index of refraction differs from that of the surroundings, although, of course, such region may also have a solid object associated therewith. This actually occurs when the shock waves about a model in a wind tunnel are being observed, since the model and its system of disturbances in the surrounding medium are, of course, closely associated with each other.

Referring now to either Fig. 1 or Fig. 2, it will be seen that there is a region in the light path where the rays are parallel, namely, in the beam 15. It is in this region that the Ronchi grating is located. The lines or wires of this grating, which conveniently may lie in the range of 25 to 200 per inch, are placed parallel to the length of the slit 4, which, in the present instance, is perpendicular to the plane of the drawing.

Since this grating is in a parallel beam, it will cast a shadow that is sharp and invariable regardless of whether the grating is located in the full line position 14, or the dotted one 26, or anywhere else between lens 13 and screen 16, for that matter.

When the "object" or region 7 or 18 contains refractive gradients due to differences in the composition or density of the fluid in this space, rays passing through these regions will be deviated in direction, and after leaving the disturbed region will travel in straight lines, in directions different from those of the undisturbed rays. These rays, nevertheless, eventually will arrive at the same respective points in the plane of the screen 16 as they would have, had they not been deviated from their courses. Each such path, at any intermediate plane, deviates from the path of the undisturbed ray by an amount readily calculable from the geometrical optics of the system in terms of the angle of deviation.

In view of the above discussion it is seen readily that the normal image in plane 16 will show the outline of any object in the field of view, superimposed upon a uniformly illuminated background upon which the grating shadows show as uniformly spaced parallel dark lines.

In the case where a ray is bent laterally in the object region, this ray will pass through a different portion of the grating plane, thus causing a displacement of the grating shadows in the corresponding image area.

The relation between the shift in the grating shadows and the angular deviation of the rays in the object region may be determined from geometrical optics for any position of the Ronchi grating. Thus the component of the optical path gradiant, normal to the grating, may be determined.

Figure 6:
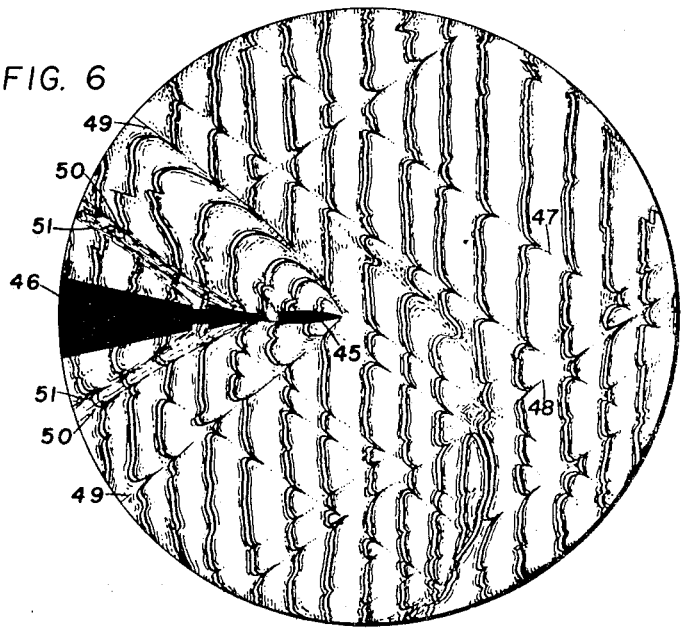
Fig. 6 is a copy of the same object as Fig. 5, but under conditions of supersonic gas flow.

The sensitivity of the above system may be varied from zero, with the grating in the plane 16, to a maximum, with the grating in contact with the lens 13. This is of importance, as it is difficult, with large deviations, to identify the shadow at the higher sensitivities, due to the large shift occurring in such cases. This will be understood upon reference to photographs made by the apparatus, such as are illustrated in Figs. 5 and 6. Without at this time discussing these figures in detail, attention is called to the fact that Fig. 5 indicates a stationary condition of the gas whereas Fig. 6 corresponds to a supersonic flow thereof. Each double line, with its satellite fringes, in Fig. 5 is the shadow of a corresponding line of the Ronchi grating, and no question thus can arise as to the proper sequence of the said lines. However, in Fig. 6 the situation is not so simple. While each line still appears to be continuous in a general vertical direction, although badly kinked and sharply bent at various points, this impression may be illusory and actually any given line of the grating may really be represented by more than one shadow line, and in particular these shadow lines cannot be followed through a discontinuity in the refractive index in the "object" region. Thus the identity of a shadow line may in many cases be established only by a number of photographs taken at various known sensitivities.

As stated before, the Fig. 2 form of the apparatus has certain advantages over that shown in Fig. 1. The chief advantage will be obvious from a comparison of Figs. 1 and 2, namely, in Fig. 1 the region in which the phenomena to be studied occur is the cone of rays having 4 as its vertex and the reflecting surface 8 as its base, whereas in Fig. 2 the phenomena may be located anywhere in the cylinder of rays based or terminated on the two reflecting surfaces, 8 and 19, with the further limitation in each case, of course, that, in both forms, regions common to two light paths should be avoided, to prevent confusion.

Nevertheless there is still a much larger region available in the Fig. 2 form, and this whole region has the further advantage that the rays traversing it are parallel, and not divergent as in Fig. 1, so that Fig. 2 gives a far more satisfactory device than Fig. 1, for purposes of mathematical interpretation of the results.

The illustration designated as Fig. 4 represents a glass disk which has certain optical inhomogeneities or imperfections therein. The roughly circular-arcuate configuration extending between reference characters 43 and 44 is a shadow-picture of an optical defect in the glass disk, which though practically invisible when the disk is examined directly, shows clearly when observed with the help of the present apparatus.

Numerous other minor optical defects are also revealed in Fig. 4, in fact, if the glass under observation were optically perfect, all the black lines of Fig. 4 would be as straight and uniformly spaced, as the wires of the Ronchi grating. Thus, each imperfection of the image, in general, denotes a corresponding defect of the glass disk.

The distortion produced, which, as already stated, increases in direct proportion to the distance between the grating and the screen, may be varied by moving the grating 14, between the screen 16 and the lens 13. Shifting said grating farther from the screen 16 and correspondingly closer to the lens 13 thus increases the magnitude of the said distortion, and vice versa, thus making it possible to select the most suitable value for any given instance. It also makes it possible to determine the actual shift of the shadows.

Referring now to Fig. 5, this represents a photograph made with the same glass disc as Fig. 4. The disc, in each case, formed a window in a wind tunnel, but in making Fig. 5 a Ronchi grating with much wider spacing of its opaque elements was used. This yields less detail. Comparison of Figs. 4 and 5 shows that the arcuate optical flaw in the glass disc appears in both, but not with equal detail.

Fig. 5 shows the photographic record, or the visual appearance, obtained when the gas in the wind tunnel is at rest relative to the model 45 which is held by a suitable support 46. In this situation no features appear on the photograph except the shadow of the model 45 and support 46, and the images of the Ronchi wires, which would, however, be straight if the glass window were optically perfect.

Fig. 6 shows the changed appearance caused by the presence of a gas flow at supersonic velocity, from right to left. Slight irregularities in the walls of the wind tunnel now set up shock waves, which reflect back and forth within the tunnel, and show here as practically straight lines, like 47 and 48. These lines are generated by the alined distortions of certain wire shadows. The arcuate defect in the glass still shows, but there is no difficulty in distinguishing it from the shock wave lines.

The important features to be observed are, of course, the shock waves produced by the model 45, such as lines 49, 50, 51 and others. These lines are likewise formed by properly correlated distortions of the wire shadows.

It will be understood that the actual photographs show much more detail than it is possible to illustrate in line drawings like Figs. 4, 5 and 6, and considerably more and better information may be obtained from such photographs or by actual visual observation of the apparatus.

It is clear that in order to provide a clear evaluable "shadow" of the phenomenon under observation, the rays of light must be properly organized or directed at the corresponding region, that is, they may be either uniformly convergent or divergent, as though originating at a narrow slit, or at a point, or else parallel, which amounts to saying that said point or slit is then at an infinite distance. For convenience, the expression "a set of directed rays" is used in the claims to designate these conditions. As an example, Fig. 1 uses the divergent rays at 5, while Fig. 2 provides the parallel ones at 17.

Obviously many modifications and variations of the present invention are possible in the light of the above teachings. It is therefore to be understood that within the scope of the appended claims the invention may be practiced otherwise than as specifically described.

What is claimed is:

1. In an optical system comprising a source of light and means for producing a set of directed rays therefrom capable of forming sharply defined shadows of objects within said set of rays, a lens for producing an image of said objects, a screen for receiving said image and a Ronchi grating between said lens and screen, said lens being so located that the rays of said set that pass therethrough are rendered parallel in the region between the lens and the screen.

2. The combination defined in claim 1, wherein the Ronchi grating is shiftable in the region between the said lens and screen.

3. An optical system comprising a source of light, a concave reflector receiving light from said source, a slit between the source and the reflector through which must pass the light received by the reflector, said slit being at a distance from the reflector greater than the principal focal distance of the latter, whereby a real image of the slit is formed, a lens having said image at its principal focal point, an image-receiving screen beyond said lens, and a Ronchi grating between said lens and screen, the opaque elements of said grating being parallel to the slit.

ROCHELLE PRESCOTT.

REFERENCES CITED

The following references are of record in the file of this patent:

UNITED STATES PATENTS

| Number | Name | Date |
|---|---|---|
| 1,241,612 | Emerson | Oct. 2, 1917 |
| 1,590,532 | Lenouvel | June 29, 1926 |
| 1,931,477 | Allen | Oct. 24, 1933 |
| 2,362,235 | Barnes | Nov. 7, 1944 |

FOREIGN PATENTS

| Number | Country | Date |
|---|---|---|
| 587,034 | France | Jan. 12, 1925 |
| 888,644 | France | Sept. 13, 1943 |